April 24, 1956  E. L. VAN CAMP ET AL  2,742,961
AUTOMOBILE WINDOW SCREEN
Filed Oct. 26, 1953
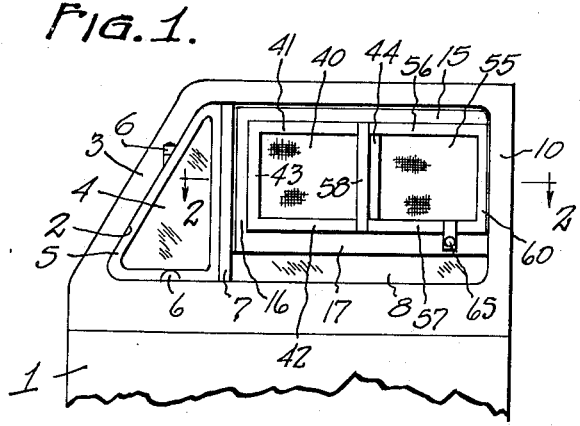
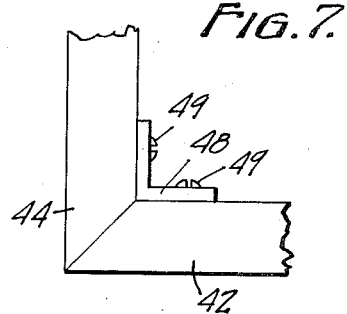
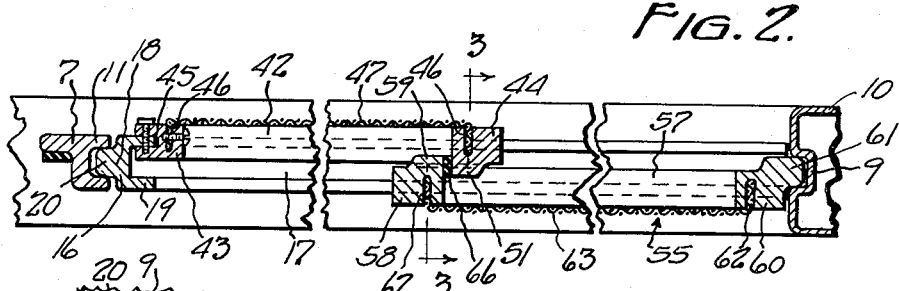
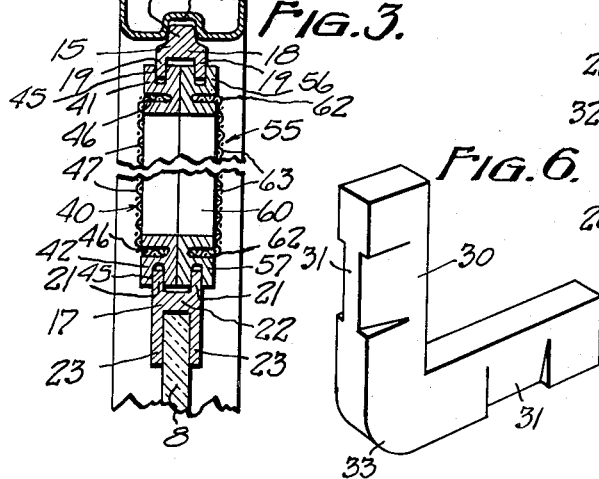
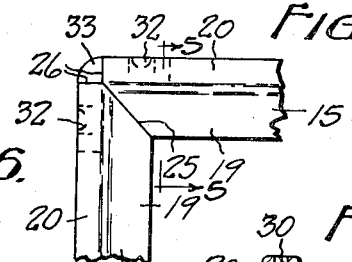
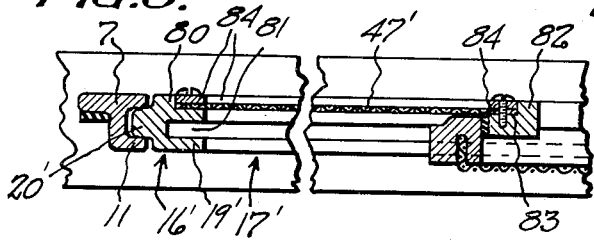
ERNEST L. VAN CAMP
JOHN J. JESSUP
INVENTORS.
BY Eugene C. Knoblock
ATTORNEYS.

United States Patent Office 2,742,961
Patented Apr. 24, 1956

2,742,961
AUTOMOBILE WINDOW SCREEN

Ernest L. Van Camp and John J. Jessup, South Bend, Ind.

Application October 26, 1953, Serial No. 388,134

10 Claims. (Cl. 160—105)

This invention relates to improvements in automobile window screens.

The primary object of the invention is to provide an automobile window screen which can be installed easily, quickly and without the use of special tools.

A further object is to provide an automobile window screen having a frame of substantially C-shape whose parts are adapted for detachable but fixed anchorage with parts of the automobile window structure, and which frame mounts a pair of screen elements of which one is slidable and adapted for detachable but fixed anchorage with another portion of the automobile window structure.

A further object is to provide an automobile window screen having a frame and a pair of screen elements mounted in said frame and at least one of which is shiftable in a guided path upon said frame between a closed position and an open position, said open position facilitating passage of the arm through the window for signalling purposes and also facilitating release or dismounting of the entire screen unit from the automobile window structure.

Other objects will be apparent from the following specification.

In the drawing:

Fig. 1 is a fragmentary view of an automobile door having our new automobile window screen mounted therein;

Fig. 2 is an enlarged horizontal sectional view taken on line 2—2 of Fig. 1;

Fig. 3 is an enlarged vertical sectional view taken on line 3—3 of Fig. 2;

Fig. 4 is an enlarged fragmentary side view of a part of the frame of the device;

Fig. 5 is a fragmentary sectional view taken on line 5—5 of Fig. 4;

Fig. 6 is a perspective view of a corner member employed in the frame to join the parts thereof;

Fig. 7 is a fragmentary side view of the corner construction of one of the individual frame screens; and Fig. 8 is a fragmentary sectional view of an alternative construction, taken on line 2—2 of Fig. 1.

Referring to the drawing, and particularly to Figs. 1 to 7, which illustrate the preferred embodiment of the invention as applied to the front door window of an automobile or truck, the numeral 1 designates a door having a window opening 2 formed therein. Since the window is formed in the front door which characteristically has an inclined frame part at 3 whose inclination corresponds to the inclination of the windshield of the automobile body, the window employed is of sectional character. Thus a front window panel 4 will be mounted in a marginal frame 5 which is pivoted at 6 on a substantially vertical axis so located that the front window unit may swing between an open position and a closed position at which the frame 5 thereof bears against the front marginal portion of the window frame at 3 and against a divider or separator strip 7 which is preferably positioned vertically as shown. A sliding glass panel 8 shifts vertically and endwise in guides 9 in the vertical part 10 of the window frame and in a channel 11 formed in the separator 7. This construction is cited as illustrative and is not intended to be limiting, and it will be understood further that the auto window screen may be used in automobile window openings in rear doors in the case of four-door sedans, or in window openings fixed in the automobile body, in the case of two-door automobile body models.

Our new auto window screen comprises three essential parts. These parts constitute a main frame and two window screen units. The main frame is adapted to be mounted detachably in the window opening of the automobile, and at least one of the two screen units is adapted to shift for opening purposes, as to facilitate passage of an arm through a window opening for signalling purposes.

The main frame of the screen is preferably of substantially C-shape and incorporates an upper frame member 15, an upright end frame member 16, and a lower frame member 17. The upper and lower frame members 15 and 17 are of a length to substantially span the horizontal dimension of the window opening, that is, the space between the separator bar 7 and the door frame part 10 in a door construction as illustrated in Fig. 1, although it will be understood that in other types of windows the same approximate proportions will apply. The upper part 15 and the upright part 16 of the frame 15, 16, 17 are preferably substantially similar in cross-sectional shape. As best seen in Figs. 2 and 3, the parts 15 and 16 are substantially C-shaped in cross-section, having a central portion 18 from which extend a pair of substantially parallel spaced flanges 19 in one direction. A longitudinal rib 20 projects centrally and in the opposite direction from the part 18. The rib 20 is of reduced dimension and is adapted to fit snugly in the channel 9 at the top of the window opening with respect to the member 15, and in the channel 11 in the separator 7 in the case of the upright member 16.

The bottom or lower substantially horizontal part 17 of the main frame is preferably of H-section, as best seen at the bottom in Fig. 3. The member 17 has substantially parallel upwardly projecting flanges 21 whose spacing and dimensions substantially conform to and are similar to the dimensions and spacing of the flanges 19 of the parts 15 and 16. The member 17 has an intermediate body portion with which the flanges 21 merge and with which also merge downwardly extending wide flanges 23. The width of the flanges 23, that is, the spacing between the intermediate member 22 and the bottom edges of the flanges 23, will preferably be greater than the width of the flanges 21, and these flanges 23 will be so spaced as to fit snugly upon the upper marginal portion of the window glass pane 8 in such a manner as to avoid the occurrence of any free passages between the window pane and the frame. The glass panes 8 of automobile windows commonly have curved or rounded corners, and the width of the flanges 23 will be greater than the radius of curvature of the rounded corners. The channel defined by the parts 22 and 23 may be lined if desired for cushioning purposes and anti-rattle purposes, in a manner well understood in the art.

The frame parts 15, 16 and 17 are connected together as best illustrated in Figs. 4, 5 and 6. Thus the adjacent parts are preferably mitered or beveled at 25, and the tongues 20 thereof, in the case of the parts 15 and 16, have end edges 26 perpendicular to the longitudinal dimensions thereof. The ribs 20 are grooved at 27 adjacent the ends thereof to receive the leg portions of L-shaped joint members of the character best illustrated in Fig. 6. This L-shaped member 30 has two legs of substantially equal length whose transverse dimension, that is, whose width and thickness preferably correspond to the depth and width of the groove 27. The legs 30 are preferably recessed or of reduced width at 31 adjacent the outer margins thereof so that the walls of the tongues 20 may be recessed or indented at 32 to seat in the recesses 31 and lock the L-shaped member 30 to the frame members. The L-shaped frame member will preferably have a rounded edge portion at 33 in the case of the member which joins the frame parts 15 and 16, so as to fit in the channel in the frame which receives the glass window 8, the curvature or radius at 33 being substantially equal to the radius of the round portion or corner of the glass pane 8. In the case of the joint between the upright frame part 16 and the lower frame part 17, it will be understood that one leg of the L-shaped member 30 will be of a width to fit snugly between the flanges 23 for a short distance at which the window pane 8 which fits between the flanges 23 is rounded at its corner. For this purpose one leg of the member 30 which passes between the flanges 23 may be shorter than the other. In the event the window panel has no substantial rounding at its corner, alternate means for joining the frame parts 16 and 17 may be employed, such as corner pieces welded, soldered, bolted or otherwise fixedly secured to the external surfaces of the members 16 and 17 at their point of junction.

The dimensions and proportions of the main frame will be such that the same can be inserted into a window opening by first inserting the tongue of the upright member 16 into the channel in the upright part of the window frame, such as the separator 7. Thereupon, the frame can be swung inwardly to a plane substantially parallel to the plane of the window pane 8, and the frame can be shifted upwardly to cause the tongue 20 of the top frame part 15 to enter the top channel 9 which is provided normally to receive the top margin of the glass panel 8 when that glass panel is closed. The overall dimension of the frame, considered vertically, is less than the height of the window opening, so that the bottom edge of the bottom frame part 17 will be clear of the bottom edge of the window opening. Thereupon the window panel 8 may be slid upwardly and caused to enter the channel in the bottom frame part 17 between the flanges 23 to fill and seal that channel and also to position or support the frame in a manner and at an elevation such that the top tongue of the top frame part 15 continues to seat in its receiving channel 9 while the weight of the frame and associated parts is carried by the window pane 8. In the preferred form only a very slight clearance will occur between the upper and lower frame parts 15 and 17 and the vertical edge of the window opposite that at which the vertical frame part 16 is located, so as to provide a trim appearance and to preclude the occurrence of gaps or openings of any substantial size.

Two screen units are carried by the frame and preferably are of substantially equal size. One of the screen units has been designated by the numeral 40. The screen unit 40 has a rigid bounding molding consisting of an upper molding part 41, a lower molding part 42, and upright molding parts 43 and 44. The parts 41, 42 and 43 are preferably of substantially the same cross-sectional shape or configuration. The configuration of each of the parts 41, 42 and 43 is characterized by a longitudinal groove 45 at its outer edge of a width to slidably fit on one of the flanges 19 of the frame parts 15 and 16 or, in the case of the lower molding member 42, by a groove 45 to slide on one of the flanges 21 of the bottom frame member 17. The marginal molding of the screen unit 40 will be secured to the main frame, preferably releasably, as by bolting or otherwise anchoring the same. It will be understood that the grooves 45 will be so formed that the portion of each of the molding members 42, 43 and 44 which is positioned inwardly relative to the flange or rib 19 or 21, as the case may be, will be of a width less than the spacing between adjacent flanges 19 or 21 and preferably approximately one-half of that spacing, as best seen in Fig. 3. The outer face of each of the molding parts 41, 42, 43, 44 is preferably interrupted by a groove 46 extending longitudinally thereof and communicating at its ends with like grooves formed in the other members. These grooves are of a depth less than the thickness of the molding members and are preferably located inwardly relative to the bottoms of the grooves 45 and substantially parallel to the innermost edges of the molding members. A screen cloth 47, which spans the molding members 41, 42, 43, 44, has its margins bent perpendicularly and pressed and wedged into the grooves 46 to hold the screen cloth firmly in place. Anchor members, such as screws (not shown), pass through the molding members to intersect the grooves 46 and penetrate the inturned marginal portions of the screen cloth to hold the screen in place. The various molding members 41, 42, 43 and 44 may be secured together, as seen in Fig. 7, by the use of L-shaped brackets 48 bearing flat against the inner edges of the molding members and secured thereto by screws 49 or any other suitable securing means.

Molding member 44 of the screen unit 40 is preferably of a cross-sectional shape different from the members 41, 42, 43, and, as best illustrated in Fig. 2, may have a longitudinal rib 51 or portion of greater thickness than the thickness of the other molding parts 41, 42 and 43, for purposes to be described.

The second screen unit 55 is provided with a molding having a top member 56 and bottom member 57 which are substantially similar in cross-section to each other and to the cross-sectional shape of the members 41, 42 and 43 of the screen unit 40. The central or innermost rail member or molding member 58 is preferably constructed similarly to the molding member 44 of the screen unit 40 and includes a longitudinal flange or shoulder 59 which increases the thickness of the member and causes it to project into the path of the shoulder 51 of the member 44. Like the member 44, the member 58 preferably has a plain contour preferably free from the grooves 45 which characterize the members 56, 57, 41, 42 and 43. The outer or end upright rail 60 of the molding of the screen unit 55 is likewise substantially plain, but it is characterized by an offset longitudinal tongue or projection 61 which is so located as to enter and fit snugly within the channel receiving groove 9 of the window frame member 10 in which the glass panel 10 normally moves. Each of the members 56, 57, 58 and 60 of the movable screen unit 55 has a longitudinal groove 62 extending lengthwise thereof and communicating with similar grooves in the other molding members and adapted to receive the inturned marginal portions of a screen cloth 63 spanning the screen unit 55. It will be understood that the screen cloth 63 will be anchored in place within the groove 62 by any suitable means, such as those described in conjunction with the screen unit 40.

The two screen units 40 and 55 are so constructed that they completely span the frame 15, 16, 17 and close the window opening defined thereby so as to prevent the passage of insects or foreign material through the open window. The screen unit 40, being preferably fixed, serves as a means to prevent release of the screen unit 55 from the mounting frame. In this connection, observe that the shoulders or stops 51, 59 of the two screen units interengage to limit the outward extension of the shiftable screen unit 55 relative to the mounting frame. Consequently, when the screen unit 40 is fixed, the limit of travel provided for the screen unit 55 when the parts are arranged as illustrated at 52 is a limit between the Fig. 2 position and a position in which the screen unit 55 is shifted to the left from the Fig. 2 position to the maximum extent permitted by the dimensions of the device. The opening in any event will be sufficient to permit a person to thrust his arm through it for purposes of signalling in traffic, where that is required.

The screen unit may be formed from any material found suitable. Thus, we prefer to employ metal members for the frame members and for the screen unit moldings, for example, aluminum extrusions. Other materials may serve as well, particularly materials such as thermoplastic resins or thermosetting resins may be employed for the frame members 15, 16 and 17 and for the molding members 41, 42, 43, 44, and 56, 57, 58 and 60. The screen cloth employed will preferably be woven wire metal, although screening formed from plastic strands or any other suitable material may be employed with equal facility.

In order to assure against displacement of the movable screen incident to vibration and other forces acting thereon during the operation of an automobile, it is desirable to provide a releasable latch by means of which it may be positioned at any selected point. Such a latch has been illustrated in Fig. 1 at 65 and may consist of a leaf spring or like member carried by one of the two parts 17 and 57 and engageable in a socket or recess in the other of the two parts at a selected position of the movable screen 55, such as at the closed position of that movable screen unit. The leaf spring will preferably be manually manipulable from the interior of the auto only, so that it may be shifted clear of the receiving socket when it is desired to manipulate the screen 55. Such a latch is illustrative only and it will be understood that any other construction of releasable latch serving the purpose of holding a shiftable screen element in a closed position may be employed as found suitable or desirable. It will also be understood that the screen unit 40 need not be fixedly secured to the mounting frame, and, instead, may have one or more latch means comparable to latch 65 associated therewith to hold the unit in a selected operative position under normal operating conditions and releasable to accommodate movement of the screen member 40 with respect to its mounting frame. Such means may be preferred from the standpoint of simplicity of construction and assembly of the screen unit, and, further, for the purpose of facilitating removal of the screen unit 40 from its frame as may be desirable for purposes of replacing a screen cloth 47 therein if such screen cloth becomes injured or damaged.

The unit constructed as described above possesses a number of advantages. One of the principal advantages is the simplicity of the installation of the screen unit. For installation, the unit in its preassembled condition will preferably be conditioned with the slidable screen unit somewhat retracted. The window pane 8 will be substantially completely opened and, as best seen in Fig. 1, this will provide clearance in the window opening for manipulation of the new device. In the usual installation, the rib 20 of the frame member 16 will preferably be inserted in the receiving groove 11 of the member 7, and the entire frame will then be swung into the plane of the window pane 8. Thereupon the window pane 8 is raised and caused to enter the groove between the flanges 23 of the member 17 to push upwardly upon the screen assembly and to lock the same in a position with the rib 20 of the upper frame member 15 seating in the glass-receiving channel or groove 9 at the upper part of the window frame. The rear end of the upper part 15 of the screen frame will preferably be contoured to fit in the corner of the window opening in a snug and properly seating fit so as to avoid openings or excessive clearance. That same situation applies with respect to all of the other parts of the frame, namely, a shaping thereof to conform to the shape and contour of the window opening and the parts thereof which they respectively engage. When the frame has been anchored in the position shown, the screen unit 55 may be moved to extended position with the rib 61 of the molding part 60 thereof seating in the glass-receiving channel 9 of the part 10, as seen in Fig. 2. The movement in this direction may be cushioned by a pad 66 formed of a material such as sponge rubber which is interposed between the confronting surfaces of the stops 51 and 59 of the molding at 44 and 58, respectively. Such a compressible pad 66 acting in association with the latch 65 serves to firmly hold the unit 55 in its closed position and in a manner to take up play and avoid rattle and chatter. At the same time release of the slidable screen unit 55 may be accomplished rapidly by releasing the latch 65 and sliding the unit so as to facilitate passage of the arm of the driver through the screen to signal oncoming cars or following cars, in the event of a stop or a turn.

Other advantages of the device are that it is sturdy, light in weight, and that it does not require the use of external securing means to anchor it and mount it in place. Furthermore, except as wire screening or plastic screening is less transparent than glass, the device does not materially impair vision of the operator or driver of an automobile, since it is possible to see through the usual screen without difficulty. Another advantage of the device is that it constitutes a preassembled unit which can be stored in its assembled state when not in use, and which requires very small amount of space for storage purposes.

An alternative construction of the unit is illustrated in Fig. 8, wherein the screen cloth 47' is anchored directly to the frame members 15', 16' and 17' which are constructed slightly differently from frame 15, 16, 17 of the construction previously mentioned. The difference in construction as illustrated in Fig. 8 entails the formation of only one guide flange 19' upon each of the frame members 16' and the formation of an opposed body portion 80 spaced from the flange 19' to define a channel 81 preferably offset from the center of the member 16' and from its rib 20'. With respect to the member 17', the construction thereof will be changed only at the upper part thereof as viewed in Fig. 3 so as to incorporate only a single guide channel and rib and to provide a thickened body portion comparable to the body portion 80. Intermediate the length of the upper and lower frame members, there is secured thereto a rail 82 which preferably is fixedly positioned at approximately the location of the member 44 in the preferred construction. Each of the frame members 15', 16' and 17' and the member 82 has a groove 83 formed in the outer face thereof, that is, in the face of the part 80 in the case of the members 15', 16' and 17' as shown in Fig. 8. The screen cloth 47 spans the opening defined by the frame members and the rail 82 with its margin seating in the groove 83 and preferably anchored therein by a retainer strip 84 which is held in place by screws or other securing means. In this construction, the molding of the screen unit 40 of the preferred unit is eliminated, and only the shiftable screen unit comparable to the screen unit 55 of the preferred construction need be provided with a molding separate from the frame of the device. One desirable characteristic of this device is reduction in the number of parts and reduction in weight. However, this is accomplished at the sacrifice of the advantage of being able to assemble the frame and the two screen units individually and then assemble the units, inasmuch as the fixed screen unit must be applied to the frame after the movable screen unit has been mounted in the frame. This requirement, of course, necessitates that the rail member 82 shall be detachably secured to the frame member or parts 15' and 17'. Aside from this difference, the alternate form possesses all of the advantages of the preferred form.

While the preferred embodiments of the invention have been illustrated and described, it will be understood that changes in the construction may be made within the scope of the appended claims without departing from the spirit of the invention.

We claim:

1. A window screen adapted to be mounted in an automobile window frame of the type slidably mounting a window pane and having guide recesses at top and side portions thereof adapted to receive and position marginal portions of said pane, comprising a rigid frame unit having a top member, an upright member of a length less than the height of said window frame, and a bottom member, said top and upright frame members each including a longitudinal part adapted to fit in a guide recess, said bottom frame member having longitudinal bottom groove adapted to receive said pane, a screen unit fixedly spanning a portion of said frame, said top and bottom frame members each adapted to span said window frame and having a longitudinal guide, and a second screen unit having a marginal molding shiftable on said longitudinal frame guides and adapted to span the remaining portion of said frame.

2. A window screen as defined in claim 1, and releasable latch means cooperating with said frame and second screen to normally hold said second screen in operative closed position.

3. A window screen as defined in claim 1, wherein the molding of said second screen has a longitudinal part seating in a guide recess when said screen is in closed position.

4. A window screen defined in claim 1, and means for limiting sliding of said second screen on said frame.

5. A window screen as defined in claim 1, wherein said first screen unit has a marginal molding slidable in said frame, and releasable means for anchoring said first screen unit in selected position in said frame.

6. A window screen as defined in claim 1, wherein said first screen unit has a marginal molding slidable in said frame, and releasable means for anchoring said first screen unit in selected position in said frame, the adjacent ends of said screen units overlapping when closed, and the adjacent upright molding portions of said units partially intercepting to limit sliding of said second screen on said frame.

7. A window screen as defined in claim 1, wherein said frame members have longitudinal grooves at their ends communicating with similar grooves in adjacent frame members, and an L-shaped member secured in said grooves to interconnect said frame members.

8. The combination with a window frame having guides, a window pane shiftable in said frame guides and means for positioning said pane in said frame, of a rigid screen frame substantially of C-shape having top and bottom parts of a length substantially equal to the width of the window opening defined by said window frame and an upright part of lesser height than said window opening, means on said top and upright frame parts interfitting with said guides, means on said bottom frame part interfitting with said pane, said pane supporting said screen frame in said window frame, a screen unit fixedly spanning a part of said screen frame, a second screen unit having a rigid marginal molding slidable in and adapted to span the remainder of said screen frame and having a part interfitting with a guide.

9. The construction defined in claim 8, and a latch for locking said second screen in closed position.

10. The construction defined in claim 8, and means for limiting sliding of said second screen in said screen frame.

References Cited in the file of this patent

UNITED STATES PATENTS

| | | |
|---|---|---|
| 140,674 | Boughton | July 8, 1873 |
| 1,608,785 | Evans | Nov. 30, 1926 |
| 1,701,848 | Hickman | Feb. 12, 1929 |
| 1,798,600 | Gooch | Mar. 31, 1931 |
| 2,307,477 | Wilber | Jan. 5, 1943 |
| 2,540,504 | Beneteau | Feb. 6, 1951 |
| 2,581,843 | Edwards | Jan. 8, 1952 |